US009053550B2

United States Patent
Li et al.

(10) Patent No.: US 9,053,550 B2
(45) Date of Patent: Jun. 9, 2015

(54) TECHNIQUES FOR RAPID STEREO RECONSTRUCTION FROM IMAGES

(75) Inventors: Jianguo Li, Beijing (CN); Ying Zheng, Hefei (CN); Qiang Li, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 13/321,537

(22) PCT Filed: May 21, 2009

(86) PCT No.: PCT/CN2009/000554
§ 371 (c)(1),
(2), (4) Date: Jan. 31, 2012

(87) PCT Pub. No.: WO2010/133007
PCT Pub. Date: Nov. 25, 2010

(65) Prior Publication Data
US 2012/0127171 A1    May 24, 2012

(51) Int. Cl.
  *H04N 7/18*    (2006.01)
  *G06T 7/00*    (2006.01)
(52) U.S. Cl.
  CPC .................................. *G06T 7/0075* (2013.01)
(58) Field of Classification Search
  None
  See application file for complete search history.

(56) References Cited

U.S. PATENT DOCUMENTS

| 8,045,793 B2 | 10/2011 | Ku et al. |
| 2008/0246848 A1* | 10/2008 | Tsubaki et al. ............ 348/208.4 |
| 2010/0111444 A1* | 5/2010 | Coffman ...................... 382/285 |
| 2010/0215101 A1* | 8/2010 | Jeon et al. ................ 375/240.12 |

FOREIGN PATENT DOCUMENTS

| CN | 101354796 A | 1/2009 |
| CN | 101383051 A | 3/2009 |
| JP | 2009-43221 A | 2/2009 |
| KR | 10-0755450 B1 | 8/2007 |
| WO | 2008/110565 A2 | 9/2008 |
| WO | 2010133007 A1 | 11/2010 |

OTHER PUBLICATIONS

International Search Report and Written Opinion received for PCT Application No. PCT/CN2009/000554, Mailed on Mar. 4, 2010, 9 pages.
Office Action received in Korean Patent Application No. 10-2011-7030654, mailed Oct. 31, 2012, 10 pages of Office Action, including 5 pages of English translation.

* cited by examiner

*Primary Examiner* — William C Vaughn, Jr.
*Assistant Examiner* — Eileen Adams
(74) *Attorney, Agent, or Firm* — Trop, Pruner & Hu, P.C.

(57) ABSTRACT

Stereo image reconstruction techniques are described. An image from a root viewpoint is translated to an image from another viewpoint. Homography fitting is used to translate the image between viewpoints. Inverse compositional image alignment is used to determine a homography matrix and determine a pixel in the translated image.

22 Claims, 5 Drawing Sheets

TECHNIQUES FOR RAPID STEREO RECONSTRUCTION FROM IMAGES

CROSS-REFERENCE TO RELATED APPLICATION

This patent application is a U.S. National Phase application under 35 U.S.C. §371 of International Application No. PCT/CN2009/000554, filed May 21, 2009, entitled TECHNIQUES FOR RAPID STEREO RECONSTRUCTION FROM IMAGES.

FIELD

The subject matter disclosed herein relates generally to stereo reconstruction by images from multiple vantage points.

RELATED ART

The application of graphics and visual computing is growing in areas such as three dimensional (3D) games, virtual worlds, mirror worlds (e.g., Google Earth), and immersive user interfaces. Stereo reconstruction aims to recover dense 3D scenes from images by two or more separately placed cameras, or equivalently, from images taken by the same camera but at different view positions. In stereo reconstruction, the camera parameters (internal and external) are known by camera calibration. Traditional stereo reconstruction methods are greatly limited either by accuracy or processing speed. Accordingly, there is an increasing demand for fast and accurate stereo reconstruction.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Two known existing solutions for stereo reconstruction include (1) stereo matching stereo reconstruction (e.g., normalized cross correlation (NCC)) and (2) color or photo-consistency optimization based stereo reconstruction. An example of solution (2) is described in Y. Furukawa and J. Ponce, "Accurate, Dense, and Robust Multi-View Stereopsis," CVPR (2007) (hereafter "Furukawa's method").

Photo-consistency measures the similarity of correspondence points in a stereo image pair. Photo-consistency may be defined over regions nearby corresponding points as:

$$\sum_{x \in A} f(I_L(x) - I_R(x)),$$

where, A is a region centered at a corresponding point,
$I_L$ and $I_R$ refer to left (root) and right (translated) images,
$f_{()}$ is a metric function which may be $f(x)=\|x\|^2$,
x is an image point position, and
$I_{(x)}$ refers to the gray value at the point x.

Figure 1:
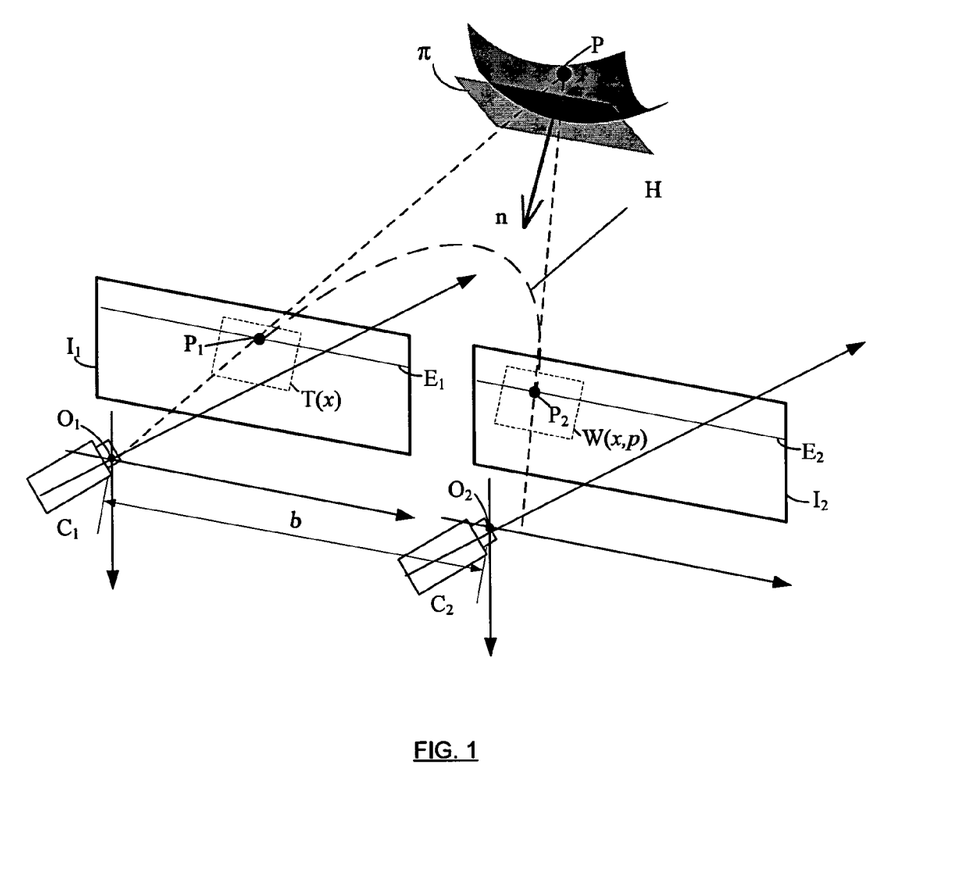
FIG. 1 illustrates a patch projection to a stereo image pair.

FIG. 1 illustrates a patch projection to a stereo image pair. The following is a description of the terms in FIG. 1:
C1 and C2: cameras
O1 and O2: camera center of two cameras (the cross point of the axes)
b: baseline between two cameras
I1 and I2: images captured by C1 and C2, respectively
P: 3D point
P1, P2: projections of 3D point P at image plane
E1, E2: epipole line passed to P1 and P2
π: the tangent plane of the 3D model surface at point P
n: the normal vector (direction) at P of the tangent plane
H: homography transform induced by the plane π
x=P$_1$
T(x): template window in the root image
W(x, p): homography warp window in the translated image Furukawa's method projects a patch around 3D point P into a stereo image pair and computes a photo-consistency metric of corresponding projection points $p_1$, $p_2$. However, the position P is not accurate and Furukawa's method assumes that the position can be changed along one direction or within a cube nearby position P. A photo-consistence measurement exists for each position and the position with the largest photo-consistence measurement may be the optimized result. The speed of computation using Furukawa's method may be unacceptable from back-projection 3D patches into image planes and its accuracy suffers from the sampling rate near the original position.

Various embodiments provide photo-consistency optimization after a traditional NCC-based stereo matching method to improve the accuracy of stereo matching and stereo reconstruction. Various embodiments that use homography fitting convert the photo-consistency measure into an implicit function of pixel coordinates and derive analytical gradient. The optimization is based on homography fitting between image planes, which has an analytical gradient and can be solved efficiently.

Compared to the NCC matching based method, photo-consistency optimization of various embodiments that use homography fitting can provide much more accurate stereo reconstruction results through the correspondence optimization.

Various color or photo-consistence optimization methods (e.g., Furukawa's method) use back-projection of 3D patches into an image plane. However, back-projection of 3D patches into an image plane is computationally intensive and time consuming. Accordingly, various embodiments provide reduced computation time compared at least to Furukawa's method.

Figure 2:
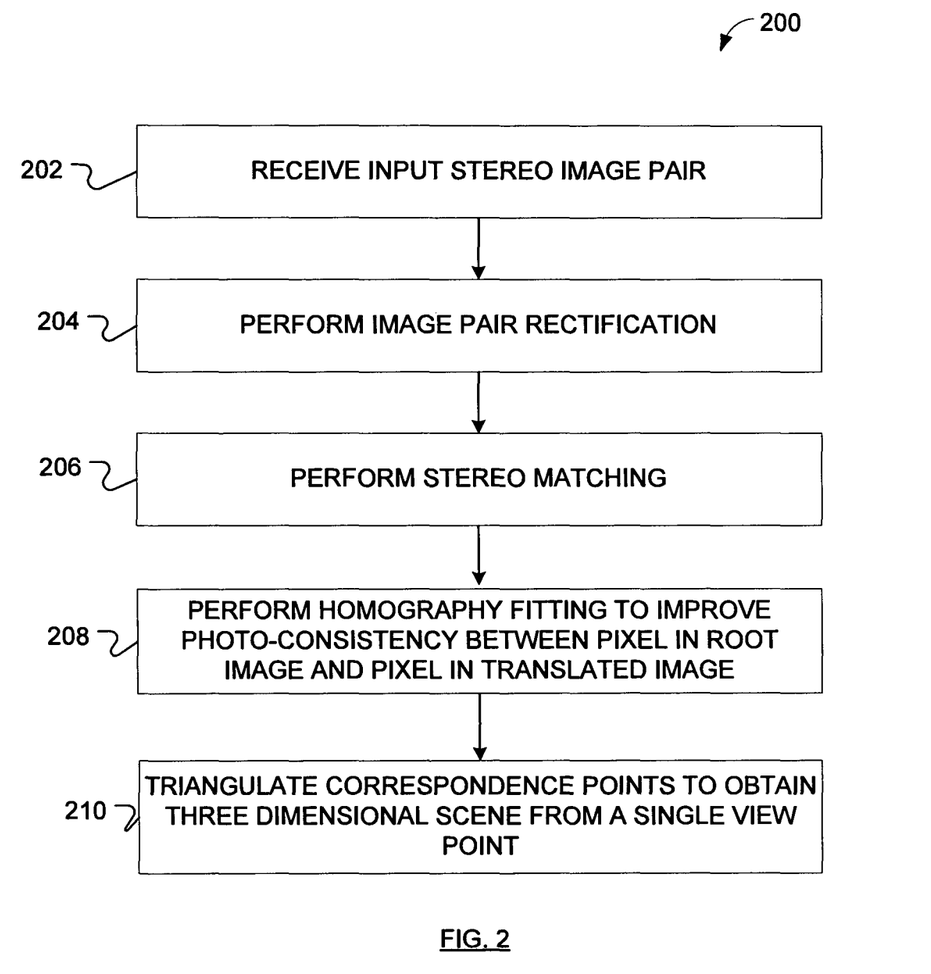
FIG. 2 depicts a process for stereo reconstruction of a stereo image pair, in accordance with an embodiment.

FIG. 2 depicts a process for stereo reconstruction of a stereo image pair, in accordance with an embodiment. Block 202 includes receiving an input stereo image pair. The stereo image pair may be provided by one or more digital cameras or a stereo camera to a computer system through an input/output interface. The input stereo image pair has the same format of a general image. For example, each image is a 2D rectangle using (x,y) as coordinates to index pixels gray-value or color.

Block 204 includes rectifying the input stereo image pair so that their epipolar lines become horizontal or vertical.

Block 206 includes applying stereo matching methods on the rectified input stereo image pair. For example, block 206 may include applying normalized cross correlation (NCC) to establish the initial correspondences between pixels from this stereo image pair. A graphics processing unit (GPU) of a computer system may perform image pair rectification and stereo matching.

Block 208 includes, for each pixel in the root image, using homograph fitting to optimize photo-consistency between a pixel in the root image and the corresponding pixel in the translated image. For example, the root image is the left image in FIG. 1 whereas the translated image is the right image in FIG. 1. A central processing unit of a computer system may perform the homograph fitting.

Block 210 includes triangulating optimized correspondence points to obtain a 3D scene from a single view point. Suitable techniques to perform blocks 202, 204, 206, and 210 are described for example in H. Hirschmfuller et. al., "Real-Time Correlation-Based Stereo Vision with Reduced Border Errors," pp 229-246, Vol. 47, IJCV 2002. A GPU of a computer system may perform triangulation of correspondence points to obtain a three dimensional view from a singe view point.

The computing procedure of stereo reconstruction in the process of FIG. 2 can be executed on a central processing unit (CPU) or graphics processing unit (GPU). Generally, the most computing complex part of stereo matching has massive data-level parallelism, which can be accelerated by using the vector processing or multi-thread processing capability of a GPU. The homography fitting is a sequential update procedure, which can be executed on a CPU.

The following describes an exemplary process performed in block 208. Homography is the mapping between two point sets corresponding to the same 3D point sets but viewed from different cameras. Homography is used as a transformation for relating two corresponding point sets in two image planes. Referring to FIG. 1, given a point $P_1$ in a root image plane, a homography H induced by a tangent plane $\pi$ (n is the normal of tangent plane) is used to find the corresponding point $P_2$ in the translated image plane. In other words, the homography H transfers $P_1$ to $P_2$ via the tangent plane $\pi$. The plane $\pi$ is a tangent plane of the object surface at the corresponding 3D point P.

Various embodiments apply homography fitting of two regions with respect to homography parameters in the optimization of photo-consistency. Referring to FIG. 1, for each pixel $P_1$ in the root image, an m×m window T(x) is placed centered at the pixel $P_1$, where x denotes the image coordinates of the pixels in the root window T(x). The corresponding pixel of x in the translated image is denoted as W(x; p)=H(p)·x, where H(p) is the homography transform. In various embodiments, H(p) is a 3×3 matrix given by internal and external parameters of a stereo camera and p is a 3-element parameter related to the depth and normal of the corresponding 3D point. Other types of homography transforms may be used.

The homography transform can be represented as:

$$H(p)=K_l(R-tp^T)K_r^{-1},$$

where $K_l$ and $K_r$ are the intrinsic matrices of respective left and right cameras, R is the rotation matrix between the two cameras, t is the translation vector between the two cameras, p=n/d, where n is the normal vector of the plane $\pi$ and d is the distance from the left camera center to the plane $\pi$.

The photo-consistency between a pixel x in the root image and the warp window, W(x; p), of the translated image, I, is defined as:

$$\sum_{x \in A} [T(x) - I(W(x; p))]^2,$$

where

T(x) is a template window in the root image,

I is a translated image, and

W(x; p) is a homography warp window in the translated image.

The photo-consistency is an implicit and nonlinear function of the homography parameter p. In various embodiments, to improve photo-consistency, an inverse compositional image alignment (ICIA) process is used. The ICIA process is modified to provide an optimized homography matrix H(p) and an optimized corresponding pixel in the translated image. For example, a suitable ICIA process is described in: S. Baker, I. Matthews, Lucas-Kanade, "20 Years On: A Unifying Framework," IJCV (2004). An exemplary ICIA process for homography fitting is described with regard to process 300 of FIG. 3.

Figure 3:
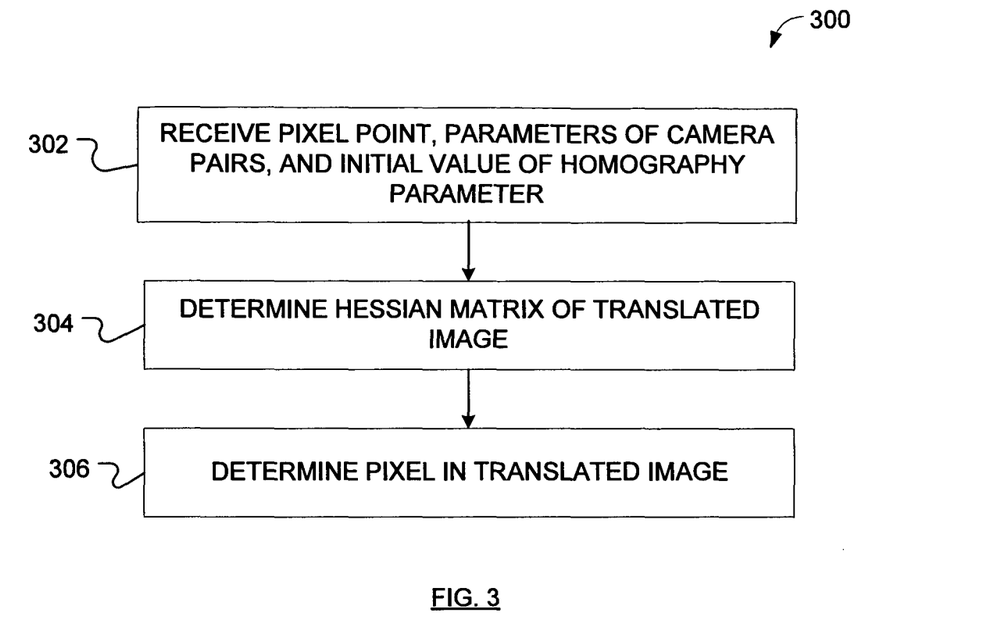
FIG. 3 depicts an inverse compositional image alignment (ICIA) process, in accordance with an embodiment.

Block 302 includes receiving pixel point x=(u, v, 1) as well as parameters of camera pairs and an initial value of a homography parameter, p. The parameters may include camera intrinsic matrix K and extrinsics (e.g., rotation matrix R and translation vector t) and initial value of a homography parameter, p (defined earlier). Parameter p can be initialized by a traditional NCC-based method according to its definition p=n/d.

Block 304 includes determining the Hessian matrix for the translated image. For example, block 304 may include: (1) evaluating the gradient ∇T of the root window T(x); (2) evaluating the Jacobian for the right image W related to p at (x; $p_o$), where the Jacobian is expressed as ∇J=∂W/∂p; and (3) determining the Hessian matrix of W related to p. The Hessian matrix may be expressed as H=$\Sigma_x$[∇T∇J]$^T$[∇T∇J]. The Hessian matrix corresponds to an improved homography matrix.

Block 306 includes determining a pixel in the translated image W(x; p). For example, block 306 may include (1) determining I(W(x; p)) by warping the translated image I with W(x; p); (2) determining the error image I(W(x; p))−T(x); (3) computing the incremental step Δp=H$^{-1}\Sigma_x$[∇T∇J]$^T$[I(W(x; p))−T(x)]; and (4) updating the warp W(x; p) by determining W(x; p)=W(x; p)·W(x; Δp)$^{-1}$. Items (1)-(4) of block 306 are repeated until an absolute value of the incremental step, |Δp|, is less than a limit value. For example, the limit value may be approximately 0.00001. Process 300 determines an optimized warp window (W(x,p)) that can be used to determine an optimized homography matrix, H=$\Sigma_x$[∇T∇J]$^T$[∇T∇J]. The optimized homography matrix H(p) can be used to determine a corresponding pixel in the translated image W(x; p)·[u, v, 1]$^T$.

Figure 4:
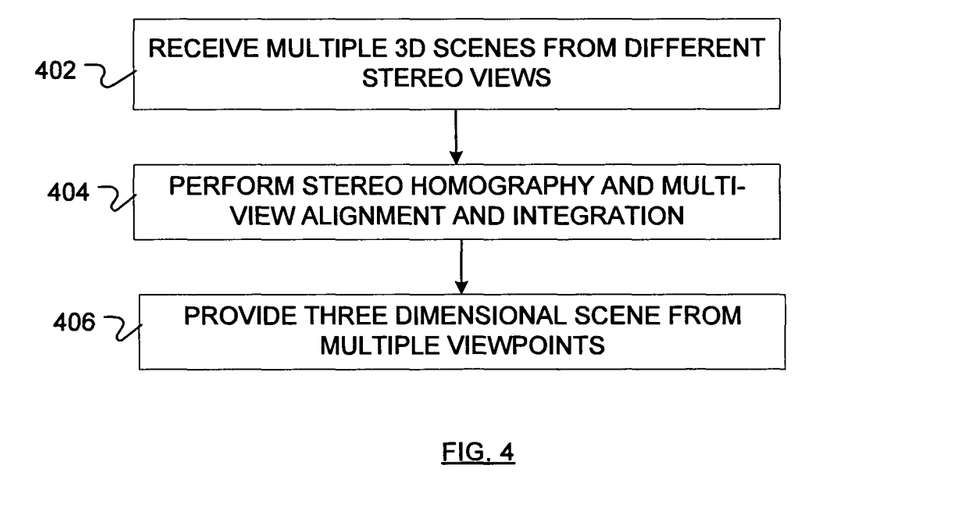
FIG. 4 depicts a process that can be used for multi-view stereo reconstruction, in accordance with an embodiment.

The stereo homography fitting techniques described with regard to FIG. 2 can be extended for application to multiple-view stereo reconstruction. Multi-view stereo can be viewed as the combination of results from multiple stereo pairs. FIG. 4 depicts a process that can be used for a multi-view stereo reconstruction, in accordance with an embodiment. Block 402 receives multiple three-dimensional scenes from different stereo views. In one example, there are three views, namely views C1, C2, and C3. Binocular stereo pairs may be from views C1-C2, C2-C3 and C1-C3.

Block 404 performs stereo homography and multi-view alignment and integration for each stereo pair. For each stereo pair, stereo homography described with regard to FIGS. 2 and 3 is applied. The optimized correspondence by homography fitting may be defined as $(x_1, x_2=w(x_1))$. After the optimized pair $(x_1, x_2=w(x_1))$ is obtained, the pair can be triangulated with the known camera parameters according to the method described, for example, in R. Hartley and A. Zisserman, "Multiple View Geometry in Computer Vision," Chapter 12, Cambridge Press, Second Version (2003). Triangulation may produce a three-dimensional point $X_{12}$ from the correspondence from each stereo pair, $X_{12}$=triangulate$(x_1, x_2)$.

Suppose $X_{12}$ is the triangulate result by C1-C2, $X_{23}$ is the result by C2-C3, and $X_{13}$ is the result by C1-C3 and $X_{12}, X_{13}$, and $X_{23}$ correspond to the same 3D point. A 3D point, X, is a function of $X_{12}, X_{13}$, and $X_{23}$, namely $X=f(X_{12}, X_{13}, X_{23})$, where f( ) is a multi-view alignment and integration function and $X_{12}, X_{13}$, and $X_{23}$ are all three-dimensional points in world coordinates. In some embodiments, the multi-view alignment and integration technique can be an average function or best-fit function, although other functions can be used.

For instance, if f( ) is defined as the average function, then the 3D point is given by: $X=(X_{12}+X_{13}+X_{23})/3$.

If f( ) is defined as the best-fit function, the 3D point is chosen which (1) the normalized vector $n_i$ is almost vertical to the camera plane or (2) $n_{ij}$ has smallest angle to the direction PO. Hence f( ) is defined as a selection function: $X=X_i$, where $$i = \operatorname*{argmin}_{i} \operatorname{Angle}(PO_i, n_i).$$

Block 406 provides a three dimensional scene based on multiple view points. The 3D points determined as X in block 404 form a three dimensional scene.

Figure 5A:
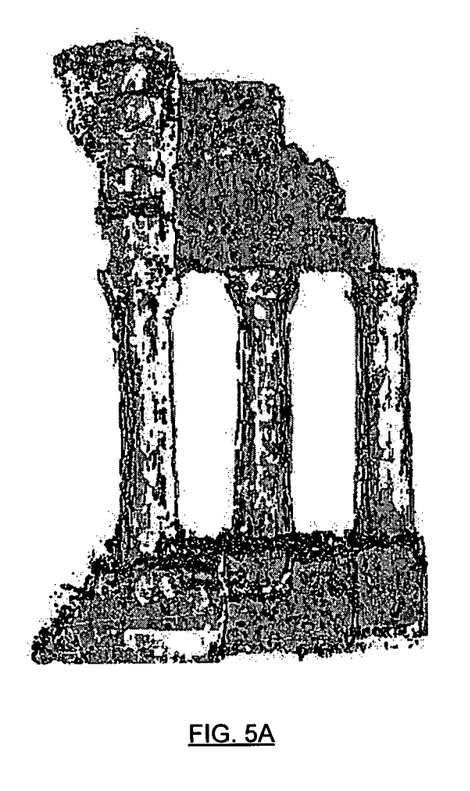
FIGS. 5A and 5B depict a comparison of results of stereo reconstruction.
Figure 5B:
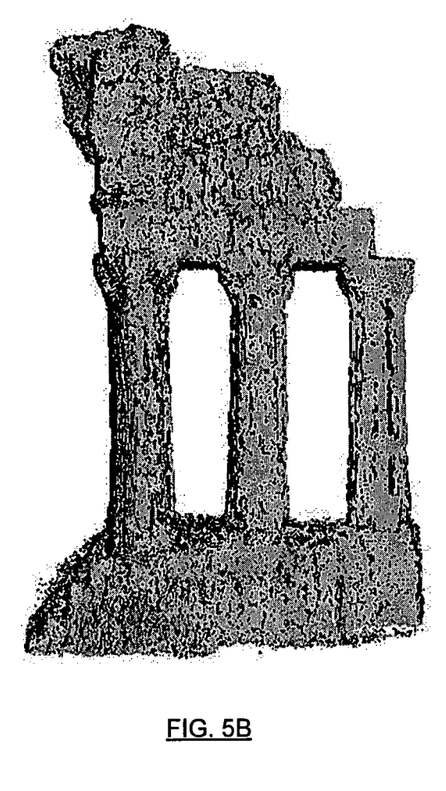

FIG. 5A depicts results of stereo reconstruction on the standard middlebury stereo evaluation set described, for example at http://vision.middlebury.edu/. FIG. 5B depicts a result from techniques that use homograph fitting based photo-consistency optimization. It can be seen that the techniques that use homograph fitting based photo-consistency optimization outperform the traditional NCC matching based method significantly at least in terms of image clarity.

Techniques that use homograph fitting based photo-consistency optimization provide similar results as Furukawa's method, but complete faster. Table 1 shows the execution time of these two methods for the stereo reconstruction task.

TABLE 1

Comparison of executive time performance

| Method | Number of corresponding patches optimized | Time |
|---|---|---|
| Techniques that use homograph fitting based photo-consistency optimization | ~958K | 2 s |
| Furukawa's method | ~972k | 158 s |

Figure 6:
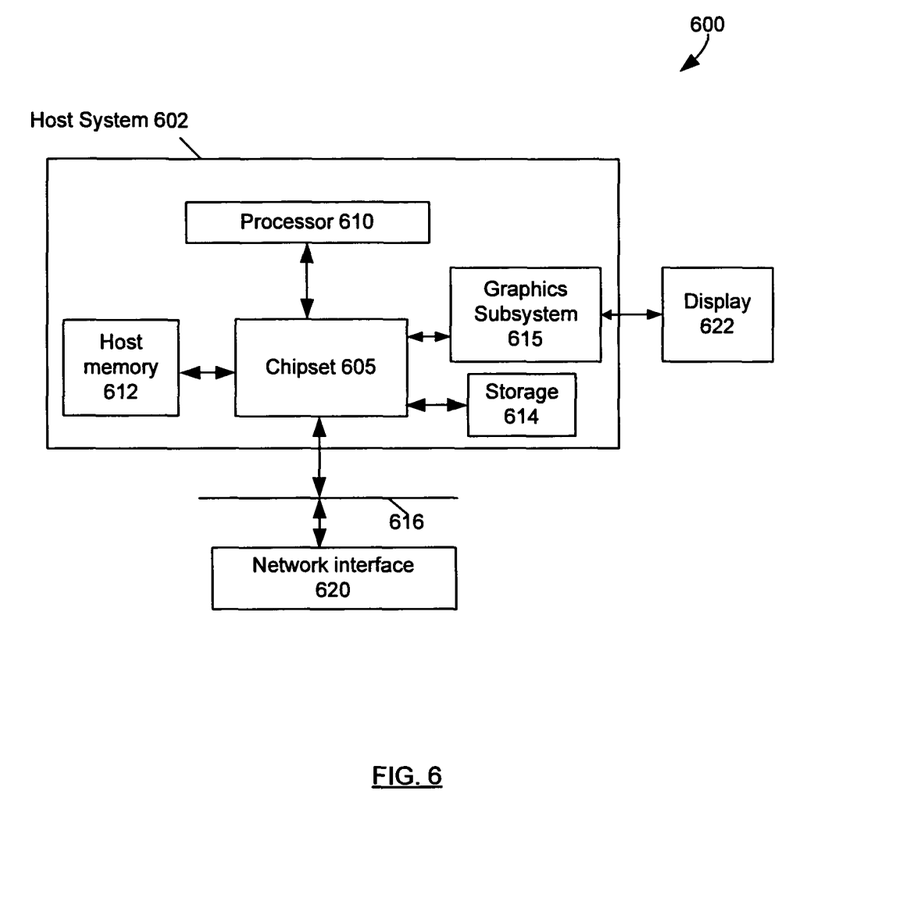
FIG. 6 depicts a computer system embodiment, in accordance with an embodiment.

FIG. 6 depicts a block diagram of computer system 600, in accordance with an embodiment of the present invention. Computer system 600 may include host system 602, bus 616, and network interface 620. Computer system 600 can be implemented in a handheld personal computer, mobile telephone, set top box, or any computing device. Host system 602 may include chipset 605, processor 610, host memory 612, storage 614, and graphics subsystem 615. Chipset 605 may provide intercommunication among processor 610, host memory 612, storage 614, graphics subsystem 615, and bus 616. For example, chipset 605 may include a storage adapter (not depicted) capable of providing intercommunication with storage 614. For example, the storage adapter may be capable of communicating with storage 614 in conformance with any of the following protocols: Small Computer Systems Interface (SCSI), Fibre Channel (FC), and/or Serial Advanced Technology Attachment (S-ATA).

In some embodiments, chipset 605 may include data mover logic capable of performing transfers of information within host memory 612, or between network interface 620 and host memory 612, or in general between any set of components in the computer system 600.

Processor 610 may be implemented as Complex Instruction Set Computer (CISC) or Reduced Instruction Set Computer (RISC) processors, multi-core, or any other microprocessor or central processing unit.

Host memory 612 may be implemented as a volatile memory device such as but not limited to a Random Access Memory (RAM), Dynamic Random Access Memory (DRAM), or Static RAM (SRAM). Storage 614 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 615 may perform processing of images such as still or video for display. For example, graphics subsystem 615 may perform video encoding or decoding. For example, graphics subsystem 615 may perform activities of a graphics processing unit described with regard to any activities described with regard to FIGS. 2-4. An analog or digital interface may be used to communicatively couple graphics subsystem 615 and display 622. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

Bus 616 may provide intercommunication among at least host system 602 and network interface 620 as well as other peripheral devices (not depicted). Bus 616 may support serial or parallel communications. Bus 616 may support node-to-node or node-to-multi-node communications. Bus 616 may at least be compatible with Peripheral Component Interconnect (PCI) described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network interface 620 may be capable of providing intercommunication between host system 602 and a network in compliance with any applicable protocols such as wired or wireless techniques. For example, network interface may comply with any variety of IEEE 802.3, 802.11, or 802.16. Network interface 620 may intercommunicate with host system 602 using bus 616. In one embodiment, network interface 620 may be integrated into chipset 605.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method to reconstruct a point on a three dimensional surface comprising:
   performing stereo matching on an image pair;
   rectifying the image pair so that epipolar lines become one of horizontal or vertical;
   applying stereo matching to the rectified image pair;
   generating a translated pixel from a root pixel, wherein the generating comprises applying a homography matrix transform to transform a pixel in a root pixel plane to a pixel in a translated image plane via a plane tangent to said three dimensional surface;
   triangulating correspondence points to generate a three-dimensional scene; and
   providing the three-dimensional scene for display.

2. The method of claim 1, wherein the applying stereo matching comprises applying normalized cross correlation (NCC).

3. The method of claim 1, further comprising:
   generating a homography matrix transform using an inverse compositional image alignment (ICIA).

4. The method of claim 1, further comprising:
   generating a homography matrix transform;
   defining photo-consistency between a root image and a warp window of a translated image as an implicit function of the homography matrix transform; and
   improving photo-consistency of the warp window.

5. The method of claim 1, wherein the generating a translated pixel from a root pixel comprises: using homograph-fitting to improve photo-consistency between the root pixel and the translated pixel.

6. The method of claim 1, wherein the homography matrix comprises:

$$H(p) = K_l (R - tp^T) K_r^{-1},$$

where $K_l$ and $K_r$ are the intrinsic matrices of respective left and right cameras,
R is the rotation matrix between the two cameras,
t is the translation vector between the two cameras, and
p=n/d, where n is the normal vector of the plane $\pi$ and d is the distance from the left camera center to the plane $\pi$.

7. The method of claim 1, further comprising generating a three-dimensional scene from multiple stereo image pairs.

8. A non-transitory computer-readable medium storing instructions, that when performed by a computer to reconstruct a point on a three dimensional surface, cause the computer to:
   perform stereo matching on an image pair;
   rectify the image pair;
   apply stereo matching to the rectified image pair;
   generate a translated pixel from a root pixel, wherein to generate the computer is to apply a homography matrix transform to transform a pixel in a root pixel plane to a pixel in a translated image plane via a plane tangent to said three dimensional surface;
   triangulate correspondence points to generate a three-dimensional scene; and
   provide the three-dimensional scene for display.

9. The computer-readable medium of claim 8, wherein to apply stereo matching, the computer is to apply normalized cross correlation (NCC).

10. The computer-readable medium of claim 8, further comprising instructions, which when executed by the computer, cause the computer to:
    generate the homography matrix transform using an inverse compositional image alignment (ICIA).

11. The computer-readable medium of claim 8, further comprising instructions, which when executed by the computer, cause the computer to:
    generate a homography matrix transform;
    define photo-consistency between a root image and a warp window of a translated image as an implicit function of the homography matrix transform; and
    improve photo-consistency of the warp window.

12. The computer-readable medium of claim 8, wherein to generate a translated pixel from a root pixel, the computer is to improve photo-consistency between the root pixel and the translated pixel.

13. The computer-readable medium of claim 8, wherein the homography matrix comprises:

$$H(p) = K_l (R - tp^T) K_r^{-1},$$

where $K_l$ and $K_r$ are the intrinsic matrices of respective left and right cameras, R is the rotation matrix between the two cameras, t is the translation vector between the two cameras, and p=n/d, where n is the normal vector of the plane π and d is the distance from the left camera center to the plane π.

14. An apparatus to reconstruct a point on a three dimensional surface comprising:

a processor configured to:

generate a translated pixel from a root pixel, wherein to generate, the computer is to apply a homography matrix transform to transform a pixel in a root pixel plane to a pixel in a translated image plane via a plane tangent to said three dimensional surface;

triangulate correspondence points to generate a three-dimensional scene; and provide the three-dimensional scene for display.

15. The apparatus of claim 14, wherein the processor is at least one of a multi-core processor and a graphics processing unit.

16. The apparatus of claim 14, wherein the processor is to:

generate the homography matrix transform using an inverse compositional image alignment (ICIA).

17. The apparatus of claim 14, wherein to apply a homography matrix, the processor is to:

generate a homography matrix transform;

define photo-consistency between a root image and a warp window of a translated image as an implicit function of the homography matrix transform; and improve photo-consistency of the warp window.

18. The apparatus of claim 14, wherein to generate a translated pixel from a root pixel, the computer is to improve photo-consistency between the root pixel and the translated pixel.

19. A system to reconstruct a point on a three dimensional surface comprising:

a display device and a computer system, wherein the computer system is communicatively coupled to the display device and wherein the computer system is to:

generate a translated pixel from a root pixel, wherein to generate the computer is to apply a homography matrix transform to transform a pixel in a root pixel plane to a pixel in a translated image plane via a plane tangent to said three dimensional surface;

triangulate correspondence points to generate a three-dimensional scene; and provide the three-dimensional scene for display.

20. The system of claim 19, wherein the computer system is to:

generate the homography matrix transform using an inverse compositional image alignment (ICIA).

21. The system of claim 19, wherein to apply a homography matrix, the processor is to:

generate a homography matrix transform;

define photo-consistency between a root image and a warp window of a translated image as an implicit function of the homography matrix transform; and improve photo-consistency of the warp window.

22. The system of claim 19, wherein to generate a translated pixel from a root pixel, the computer system is to improve photo-consistency between the root pixel and the translated pixel.

* * * * *